UNITED STATES PATENT OFFICE.

THOMAS CLARKE, OF INTERLACHEN, SWITZERLAND.

COMPOSITION OF MATTER FOR PRODUCING ENAMEL FOR REFIXING DENTAL PLATES OF ARTIFICIAL TEETH.

SPECIFICATION forming part of Letters Patent No. 618,166, dated January 24, 1899.

Application filed April 9, 1898. Serial No. 677,085. (No specimens.)

*To all whom it may concern:*

Be it known that I, THOMAS CLARKE, residing at Choisy, Interlachen, Switzerland, have invented an Improved Composition of Matter for the Production of an Enamel for Refixing the Dental Plates of Artificial Teeth; and I do hereby declare the following to be a full, clear, and exact description of the invention, such as will enable others skilled in the art to which it appertains to make and use the same.

My invention relates to an improved composition of matter for the production of an enamel for refixing the dental plates of artificial teeth, and it is designed for the purpose of overcoming the looseness of dental plates of artificial teeth resulting from the shrinking of the gums or arising from other causes, obviating the necessity for a new model to be taken of the mouth time after time, and the cost, delay, and inconvenience attending the re-covering of the plates. It matters little of what the dental plates are made—vulcanite, or gold, or of bone—or how many of the natural teeth remain, as long as there is no undue pressure on any point of the gums. So far does my invention extend that the prominences of the artificial teeth need not be ground down flat or level, but may be maintained, so that the grinding power on the food may be preserved. Where no natural teeth remain and where complete sets are required in any sudden emergency, by keeping a series of different sizes in stock a new double or single set of teeth may be supplied and comfortably and accurately fitted in a very short space of time, and this even after the immediate extraction of the teeth, avoiding thereby weeks and sometimes months of very unpleasant and unsightly delay. All that is required in any and every case is an easy channel for the gums to rest in, the enamel doing the rest. In making my rubber enamel for these purposes I proceed as follows: First, I make a saturated solution of the soft pink rubber used by dentists by dissolving it in the finest refined machine-oil. I put the rubber and oil in a jar and then place the jar in a pan of boiling water, keeping the water boiling around it, constantly stirring it, and adding a little oil carefully until the rubber is dissolved. When cold, it is of the consistency of thick cream, and I then scent it with attar of roses or some other suitable essential oil. Then, secondly, I take five parts (by weight) of the finest gums (but preferably the finest yellow gum-shellac) and place it also in a suitable jar. To this I add three parts of rectified spirits of wine and place the jar in a pan of hot water on a slow fire until the whole of the gum is entirely dissolved. To this I add three parts of the finest plaster-of-paris, reground to the utmost fineness in a mortar, with a sufficient quantity of carmine to make it of a pink color, and intimately mix. I then add one and a half parts of the vulcanite or rubber-oil—that is to say, as much as the other two constituents will carry; and, lastly, to insure purity and to keep the breath sweet I add one-twentieth part of pure Condy's fluid and then carefully mix the whole together. The enamel should now be of the consistency of thick oil-paint and should be gently reheated on the fire and again well stirred and if too thick may be thinned by adding a little more of the rectified spirit.

In the application of my enamel the pieces to be treated are first well cleaned and warmed by being plunged into boiling water and dried or warmed over the low flame of a spirit-lamp, and then the hot enamel is laid smoothly on the gum-surface of the plates, thickly or thinly, according to the looseness of the same.

Where the plates are so loose as to require an extra thick coating of the enamel, I prefer to put it on in two layers and to let the first layer set before applying the second. After the enamel is put on it is advisable to wave the piece over the low-flamed spirit-lamp, which insures the distribution of the enamel quickly. The piece (or pieces) must then rest for a few minutes until the enamel is sufficiently set to bear the impression of the finger-nail. It is then dipped in cold water for an instant and gently inserted in the mouth and the strongest pressure of the jaws exercised. The pieces may then be removed, dipped in hot water for a few seconds to soften the enamel, and the process repeated until it is seen and felt that the "bite" is perfect all around and that an accurate fit and an equable pressure over the whole surface of the gums is obtained. When no further pressure is found of use and the mold is perfect, any overflow of the enamel may be scraped off with an ivory or bone-bladed knife or its equivalent and replaced in the pot for further use. The edges may then be hardened by running them around the low flame of a spirit-lamp.

If at any time the fit is too accurate and tightness is felt or the plates are in the least uncomfortable, dipping them in hot water for a second or two removes the difficulty, while if any point of the gum is tender or swelled the enamel may be pressed down at that point, or it may be peeled off, so as to bridge the painful spot over and the part covered or not with a thinner solution. Any too-prominent part of a tooth may be easily removed by the use of a suitable file or the like. It is also clear that the pressure on any part must be from the hard vulcanite or gold plate itself, and this part of the plate must be freely cut or taken away, as the enamel is too soft to cause any pain. Though the enamel sets sufficiently hard, it is also from the heat of the mouth somewhat elastic, so that all plates (whether too loose or not) are benefited by it, because the gums have a softer bed to rest upon.

The properties of the ingredients given in this specification are what I have found most suitable for ordinary cases; but by varying them so as to make a softer enamel by leaving out the plaster-of-paris or a harder or stick enamel by leaving out the rubber-oil the adaptabilities of the process are multiform. When a tooth has been extracted, the space in the dental plate above may be covered temporarily by the stick of harder enamel. It is a very easy matter also, if desired, to cover the enamel with one or two layers of gold-leaf or to rub them into it and which, though not necessary, gives it an ornamental appearance.

To remove the enamel, it is only necessary to put the plate into boiling water for about sixty seconds, when the enamel is easily removed by a very stiff brush or by a round-ended ivory or bone knife, and after the surfaces have been brushed over with spirits of wine a reapplication may be made in the manner already described.

If any natural teeth remain in the jaw, the fit of the piece is materially assisted, as the enamel when dipped in the hot water becomes soft as pulp and can be molded around the teeth, thereby dispensing with the use of all clasps, which is a most valuable consideration, as clasps of whatever description around sound teeth must inevitably destroy them and cause the pieces to be remade with a renewal of annoyance and expense.

The enamel is absolutely innocuous, as all the ingredients employed are perfectly harmless, and this has been the great desideration sought after. It is both tasteless and (unless scent is added) scentless and renders the articulation and suction perfect, nor does it either shrink or swell. Any part may be scraped off and replaced at once. When required for use, it is only necessary to put the pot or jar into hot water until dissolved and well mixed and diluted if too thick with a little rectified spirit.

What I claim as my invention, and desire to secure by Letters Patent, is—

The improved composition of matter for the production of an enamel consisting of one and a half parts (by weight) of dental rubber dissolved in machine-oil and scented with attar of roses; five parts of yellow gum-shellac; three parts of rectified spirits of wine; three parts of plaster-of-paris reduced to a fine granular form and colored with carmine; and one-twentieth part of pure Condy's fluid, substantially as specified.

In witness whereof I hereunto affix my signature in presence of two witnesses.

THOMAS CLARKE.

Witnesses:
  A. N. CLARKE,
  F. G. HUGHES.